US011375196B2

(12) United States Patent
Auyeung et al.

(10) Patent No.: US 11,375,196 B2
(45) Date of Patent: Jun. 28, 2022

(54) METHOD OF CONTEXT MODELING FOR ENTROPY CODING OF TRANSFORM COEFFICIENT FLAGS WITH TRANSFORM SKIP, AND CODING METHOD WITH THE SAME

(71) Applicant: Tencent America LLC, Palo Alto, CA (US)

(72) Inventors: Cheung Auyeung, Sunnyvale, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 32 days.

(21) Appl. No.: 17/026,141

(22) Filed: Sep. 18, 2020

(65) Prior Publication Data

US 2021/0092382 A1  Mar. 25, 2021

Related U.S. Application Data

(60) Provisional application No. 62/903,572, filed on Sep. 20, 2019, provisional application No. 62/902,938, filed on Sep. 19, 2019.

(51) Int. Cl.
*H04B 1/66* (2006.01)
*H04N 7/12* (2006.01)
(Continued)

(52) U.S. Cl.
CPC ........... *H04N 19/13* (2014.11); *H04N 19/132* (2014.11); *H04N 19/182* (2014.11)

(58) Field of Classification Search
CPC ............................. H04N 19/13; H04N 19/176
See application file for complete search history.

(56) References Cited

U.S. PATENT DOCUMENTS

2016/0241852 A1* 8/2016 Gamei ................. H04N 19/159
2018/0063534 A1* 3/2018 Moccagatta ......... H04N 19/176
(Continued)

OTHER PUBLICATIONS

Chen et al. ("Algorithm description for versatile video coding and test model 6 (VTM 6) JVET-O2002-v2." 15th Meeting of the Joint Video Exploration Team (JVET), Jul. 2019.*
(Continued)

*Primary Examiner* — Fabio S Lima
(74) *Attorney, Agent, or Firm* — Anova Law Group, PLLC

(57) ABSTRACT

A versatile video coning method is provided for an electronic device. The method includes obtaining a video signal; partitioning the video signal into a plurality of coding blocks; generating a residual coding block from each coding block with or without transformation and quantization; splitting the residual coding block into a plurality of sub-blocks and each sub-block into a plurality of pixels; entropy coding a residual symbol level at each pixel in the residual coding block; and outputting a bitstream including entropy coded residual symbol levels. Entropy coding the residual symbol level at each pixel in the residual coding block includes context modeling of the residual symbol level of the pixel in a transform skip mode based on context information of at least three neighboring pixels of the pixel including a first pixel on the left, a second pixel on the above, and a third pixel on the left-above diagonal.

16 Claims, 6 Drawing Sheets

(51) Int. Cl.
*H04N 11/02* (2006.01)
*H04N 11/04* (2006.01)
*H04N 19/13* (2014.01)
*H04N 19/132* (2014.01)
*H04N 19/182* (2014.01)

(56) References Cited

U.S. PATENT DOCUMENTS

2020/0413069 A1* 12/2020 Lim ............... H04N 19/159
2020/0413100 A1* 12/2020 Hsiang ........... H04N 19/105
2021/0021841 A1*  1/2021 Xu ................. H04N 19/80
2021/0203934 A1*  7/2021 Karczewicz ..... H04N 19/91

OTHER PUBLICATIONS

Bross et al., "Versatile Video Coding (Draft 6)," (JVET) JVET-O2001-vE. 15th Meeting of the Joint Video Exploration Team (JVET), Jul. 2019.*

Benjamin Bross et al., "Versatile Video Coding (Draft 6)," Joint Video Experts Team (JVET) of ITU-T SG 16 WP 3 and ISO/IEC JTC 1/SC 29/WG 11, Jul. 2019, JVET-O2001-vE. 455 pages.

Heiko Schwarz et al., "Description of Core Experiment 7 (CE 7): Quantization and coefficient coding," Joint Video Experts Team (JVET) of ITU-T SG 16 WP 3 and ISO/IEC JTC 1/SC 29/WG 11, Jul. 2019, JVET-O2027-v3. 13 pages.

* cited by examiner

METHOD OF CONTEXT MODELING FOR ENTROPY CODING OF TRANSFORM COEFFICIENT FLAGS WITH TRANSFORM SKIP, AND CODING METHOD WITH THE SAME

RELATED APPLICATIONS

This application claims priority to U.S. provisional patent application No. 62/902,938, filed on Sep. 19, 2019, and U.S. Provisional Patent Application No. 62/903,572, filed on Sep. 20, 2019, contents of all of which are incorporated by reference in their entirety.

FIELD OF THE TECHNOLOGY

This application relates to the field of video coding technologies and, specifically, to a method of context modeling for entropy coding of transform coefficient flags with transform skip.

BACKGROUND OF THE DISCLOSURE

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). Since then, they have been studying the potential need for standardization of future video coding technology which could significantly outperform HEVC in compression capability. In October 2017, they issued the Joint Call for Proposals (CfP) on Video Compression with Capability beyond HEVC. By Feb. 15, 2018, a total of 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. With careful evaluation, JVET formally launched the standardization of next-generation video coding beyond HEVC, i.e., the so-called Versatile Video Coding (VVC).

In the VVC standard (draft 6), a block of pixels can be entropy coded in a spatial domain or in a transform domain. When the block of pixels is entropy coded in the spatial domain, i.e., in a transform skip mode, the number of context coded bins in residual coding of transform coefficient is 2 bins (or 2 binary symbols) per transform coefficient with transform skip and 1.75 bins (or 1.75 binary symbols) per transform coefficient without transform skip. To improve the throughput of the CABAC coding algorithm, it is desired to keep the number of context coded bins in residual coding of transform coefficient to 1.75 with and without transform skip and without sacrificing coding efficiency.

The disclosed methods and systems are directed to solve one or more problems set forth above and other problems.

SUMMARY

One aspect of the present disclosure includes a versatile video coding (VVC) method for an electronic device. The method includes obtaining a video signal; partitioning the video signal into a plurality of coding blocks; generating a residual coding block from each coding block with or without transformation and quantization; splitting the residual coding block into a plurality of sub-blocks and each sub-block into a plurality of pixels; entropy coding a residual symbol level at each pixel in the residual coding block; and outputting a bitstream including entropy coded residual symbol levels. Entropy coding the residual symbol level at each pixel in the residual coding block includes context modeling of the residual symbol level of the pixel in a transform skip mode based on context information of at least three neighboring pixels of the pixel including a first pixel on the left, a second pixel on the above, and a third pixel on the left-above diagonal in the residual coding block.

Another aspect of the present disclosure includes a versatile video coding (VVC) system. The system includes an electronic device configured to perform obtaining a video signal; partitioning the video signal into a plurality of coding blocks; generating a residual coding block from each coding block with or without transformation and quantization; splitting each residual coding block into a plurality of sub-blocks and each sub-block into a plurality of pixels; entropy coding a residual symbol level at each pixel in each residual coding block; and outputting a bitstream including entropy coded residual symbol levels. Entropy coding the residual symbol level at each pixel in the residual coding block includes context modeling of the residual symbol level of the pixel in a transform skip mode based on context information of at least three neighboring pixels including a first pixel on the left, a second pixel on the above, and a third pixel on the left-above diagonal in the residual coding block.

Other aspects of the present disclosure can be understood by those skilled in the art in light of the description, the claims, and the drawings of the present disclosure.

DESCRIPTION OF EMBODIMENTS

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Versatile Video Coding (VVC, draft 6): VVC is a video decoding standard developed by the Joint Video Exploration Team (JVET) to succeed the HEVC (also known as ITU-T H.265). VVC specifies a video coding technology with a compression capability that is substantially beyond that of the prior generations of such standards and is highly versatile for effective use in a broadened range of applications. VCC standard is incorporated herein by reference.

Context-based Adaptive Binary Arithmetic Coding (CA-BAC): CABAC is a form of entropy coding used in the HEVC and VVC standards.

Versatile video coding Test Model (VTM, draft 6): VTM provides an encoder side description of VCC algorithm and the test procedures.

Bjontegaard delta rate (BDR or BD-rate): BDR is a method of evaluating coding efficiency by measuring bit-rate changes for a same peak signal-to-noise ratio (PSNR) of video signals.

Figure 1:
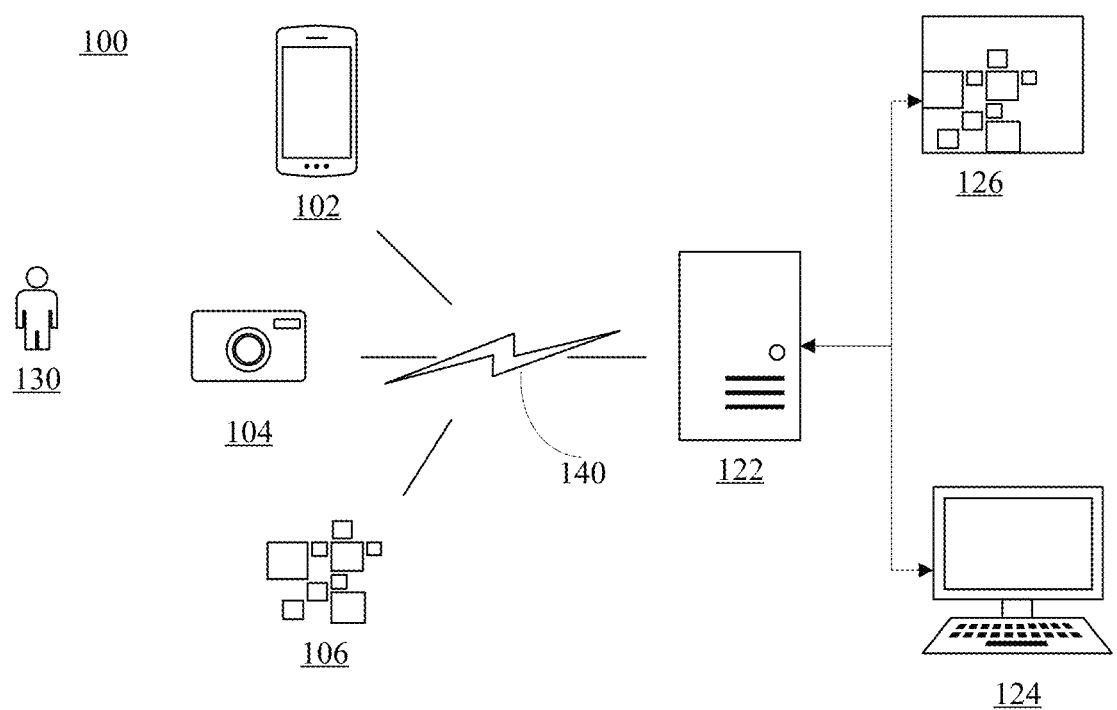
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a terminal device 102, a camera device 104, and an interne of things (IoT) device 106. Other types of devices may also be included.

The operating environment 100 may also include a server 122, a human vision application 124, a machine vision application 126, and a communication link 140 connecting the variety of devices to the server 122. A user 130 may use, access, or control one or more of the variety of devices.

The terminal device 102 may include any user terminal, such as a personal digital assistant (PDA), a mobile phone, a smart phone, an integrated messaging device (IMD), a tablet computer, a notebook computer, a desktop computer, and other computing devices. The camera device 104 may include any image or video capturing devices, such as a digital camera, a video camera, a security camera, a vehicle on-board camera, and a stereo camera, etc. The IoT device 106 may include any type of IoT device with a camera function, such as a digital doorbell, an autonomous driving sensor, a digital voice assistant, a smart speaker, a smart appliance, and any industrial or commercial IoT systems. Any of the variety of devices 102, 104, and 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

Figure 2:
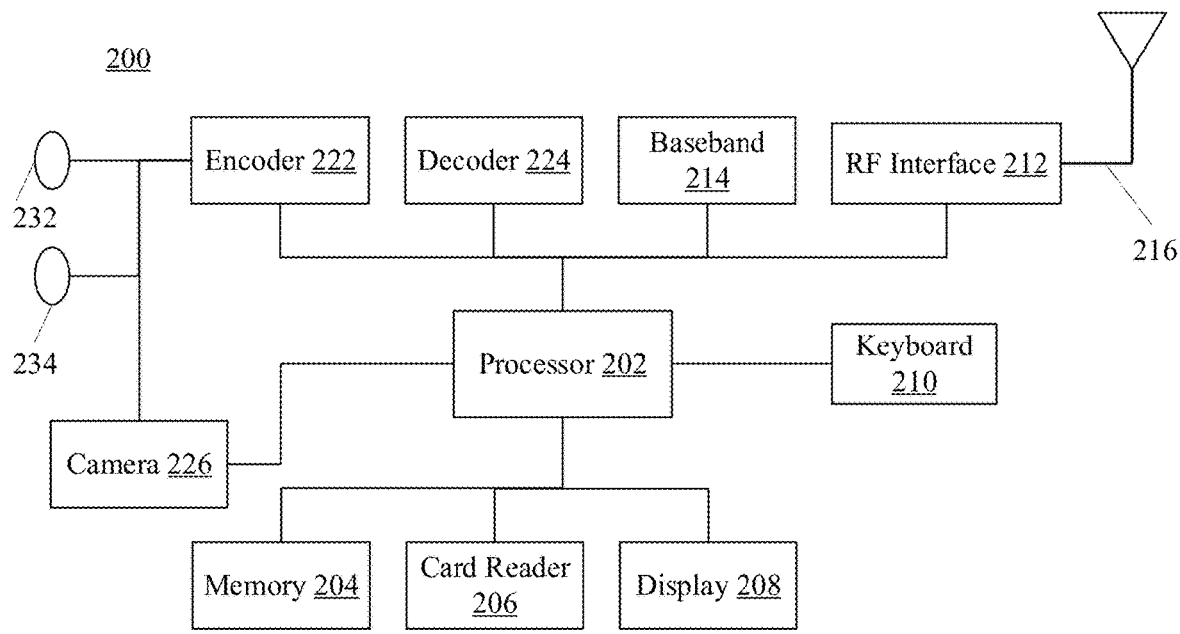
FIG. 2 illustrates an electronic device consistent with embodiments of the present disclosure.

FIG. 2 shows an electronic device for implementing any of the variety of devices 102, 104, and/or 106. As shown in FIG. 2, the electronic device 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the electronic device 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), an application specific integrated circuit (ASIC), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user 130, and may also include other types of input/output devices. The speaker 232 and the microphone 234 may be used to input and output audio for the electronic device 200.

The RF interface 212 (together with the antenna 216) may include RF circuitry for receiving and transmitting RF signals. The RF interface 212 may convert an electrical signal to an electromagnetic signal for transmitting or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the electronic device 200 is a portable device carried by the user 130, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The electronic device 200 as shown in FIG. 2 may include structures similar to those of a mobile terminal or user equipment of a wireless communication system. However, any electronic device or apparatus which may require encoding and decoding, or encoding or decoding video or images may be included.

Returning to FIG. 1, the electronic device 200 (i.e., any one or more of the variety of devices 102, 104, and/or 106) may capture or collect various data (e.g., audio data, environment/operating data, image data, and/or video data) and send the data to the server 122 through the communication link 140. The electronic device 200 may process or pre-process the data before sending the data to the server 122, or may send the unprocessed data to the server 122.

The communication link 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The communication link 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

Figure 3:
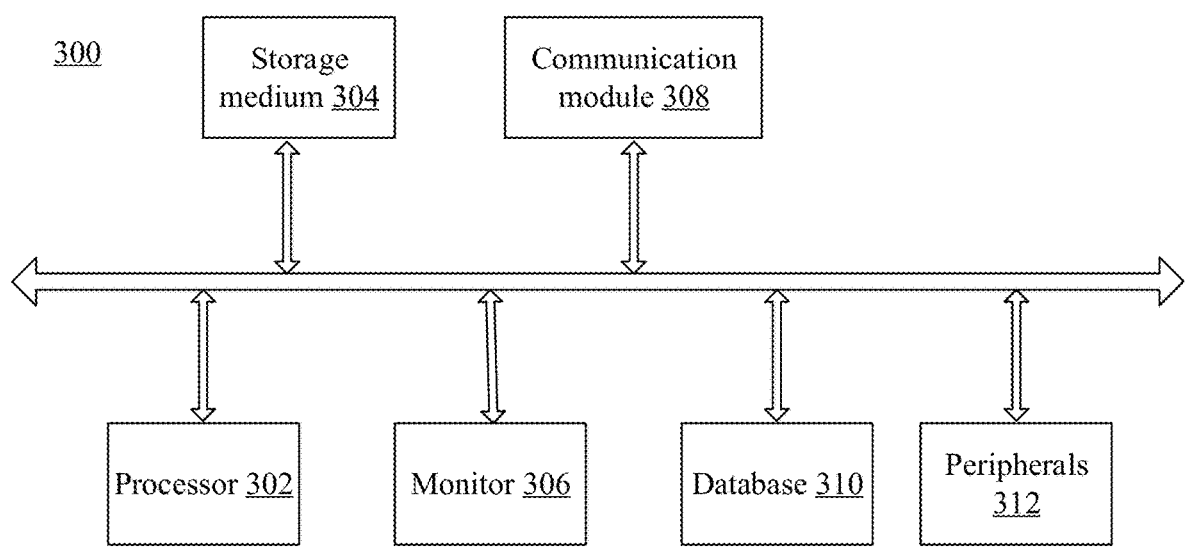
FIG. 3 illustrates a computer system consistent with embodiments of the present disclosure.

The server 122 may include any type of server computer system or multiple computer systems configured in a server cluster or distributed in different locations. The server 122 may also include a cloud server on a cloud computing platform. FIG. 3 illustrates an exemplary computer system implementing certain aspects of the server 122.

As shown in FIG. 3, the computer system 300 may include a processor 302, a storage medium 304, a monitor 306, a communication module 308, a database 310, and peripherals 312. Certain devices may be omitted and other devices may be included.

The processor 302 may include any appropriate processor or processors. Further, processor 302 can include multiple cores for multi-thread or parallel processing. Storage medium 304 may include memory modules, such as Read-only Memory (ROM), Random Access Memory (RAM), flash memory modules, and erasable and rewritable memory, and mass storages, such as CD-ROM, U-disk, and hard disk, etc. The storage medium 304 may store computer programs for implementing various processes, when executed by the processor 302.

Further, the peripherals 312 may include I/O devices such as a keyboard and a mouse. The communication module 308 may include network devices for establishing connections through the communication network. The database 310 may include one or more databases for storing certain data and for performing certain operations on the stored data, such as database searching.

Figure 4:
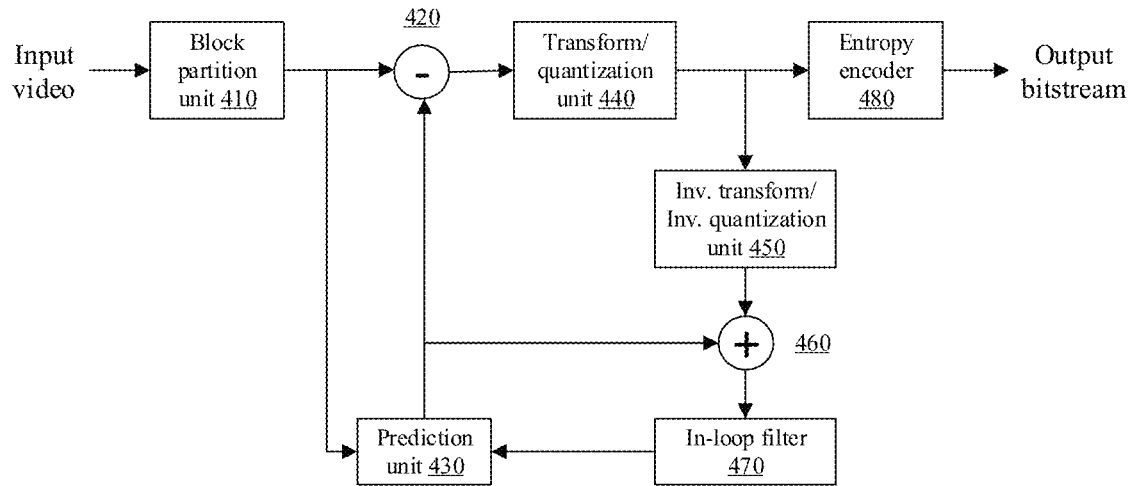
FIG. 4 illustrates a video encoder consistent with embodiments of the present disclosure.

Returning to FIG. 2, the encoder 222 may be an encoder implementing a method of context modeling for entropy coding of transform coefficient flags with transform skip. In this case, the electronic device 200 may also be considered to implement the method of context modeling for entropy coding of transform coefficient flags with transform skip. That is, the encoder 222 may be implemented as a hardware circuitry in the electronic device 200, or may be implemented as a software program by the electronic device 200, or a combination of the hardware circuitry and the software program. FIG. 4 illustrates an exemplary video encoder consistent with the disclosed embodiments of the present disclosure.

As shown in FIG. 4, the video encoder 400 includes a block partition unit 410, a subtraction unit 420, a prediction unit 430, a transform/quantization unit 440, an inverse quantization/inverse transform unit 450, an addition unit 460, an in-loop filter 470, and an entropy encoder 480. An input video is inputted into the video encoder 400 and in response, the video encoder 400 outputs a bitstream.

The input video includes a plurality of picture frames. Each picture frame is divided into a sequence of coding tree units (CTUs) by the block partition unit 410. For a picture frame that has three sample arrays, a CTU consists of an N×N block of luma samples together with two corresponding M×M blocks of chroma samples. The block partition unit 410 further splits the CTU into coding units (CUs) by using a nested multi-type tree using binary and ternary splits segmentation structure denoted as coding tree to adapt to various local characteristics. The decision whether to code a picture area using inter-picture (temporal) or intra-picture (spatial) prediction is made at a leaf CU level of the coding tree. Prediction process is applied to the leaf CU to obtain a residual block, transformation may be applied to the residual block, and the relevant information is transmitted to a corresponding decoder on a CU basis. After obtaining a residual block by applying the prediction process, a leaf CU can be partitioned into transform units (TUs) by another tree structure for residual coding with or without transformation.

The prediction unit 430 supports intra prediction, inter prediction, and combined inter and intra prediction. To capture the arbitrary edge directions presented in a natural video, the prediction unit 430 supports 65 directional (or angular) intra-prediction modes in addition to a planar (surface fitting) intra-prediction mode and a DC (flat) intra-prediction mode. The prediction unit 430 further supports inter-predicted sample generation based on motion parameters including motion vectors, reference picture indices and reference picture list usage index, and additional information needed for VVC coding features. The prediction unit 430 also supports a skip mode where the CU coded in the skip mode is associated with one PU and has no significant residual coefficients, no coded motion vector delta or reference picture index. The prediction unit 430 also supports a merge mode where the motion parameters for the current CU are obtained from neighboring CUs, including spatial and temporal candidates, and additional schedules. The merge mode can be applied to any inter-predicted CU, not only for the skip mode. The prediction unit 430 also supports an alternative to the merge mode by explicitly transmitting motion parameters, where the motion vector, the corresponding reference picture index for each reference picture list and reference picture list usage flag, and other needed information are signaled explicitly per each CU.

The subtraction unit 420 outputs a difference (or a residual) between the CU and the PU to the transform/quantization unit 440.

The transform/quantization unit 440 supports large block-size transforms up to 64×64 in size. High frequency transform coefficients are zeroed out for the transform blocks with size equal to 64, so that only the lower-frequency coefficients are retained. When transforming a large block in the transform skip mode, the transform/quantization unit 440 uses the entire block without zeroing out any values. The transform/quantization unit 440 also supports multiple transform selection (MTS) for core transform. To control the MTS, the transform/quantization unit 440 uses separate enabling flags at a sequence parameter set (SPS) level for intra and inter prediction, respectively. When the MTS is enabled at the SPS level, a CU level flag is signaled to indicate whether the MTS is applied or not. The transform/quantization unit 440 also supports other transform features described in the VVC standard (draft 6), such as low-frequency non-separable transform (LFNST) and sub-block transform (SBT).

Further, the transform/quantization unit 440 supports a maximum of 63 quantization parameters (QPs). The transform/quantization unit 440 also supports a flexible luma-to-chroma QP mapping by signaling the luma-to-chroma mapping relationship in the SPS. The transform/quantization unit 440 also supports CU-level QP adaption where delta QP values for luma and chroma components can be signaled separately. The transform/quantization unit 440 also supports other quantization features described in the VVC standard (draft 6), such as dependent quantization.

The transform/quantization unit 440 also supports joint coding of chroma residuals, which is indicated by a TU-level flag.

The WC standard (draft 6) describes CABAC as the entropy coding algorithm. The entropy encoder 480 includes a CABAC coding engine to encode syntax elements outputted by the transform/quantization unit 440. The CABAC coding engine supports arithmetic coding algorithms such as Golomb-Rice coding algorithm. The entropy encoder 480 supports separate residual coding structures for a transform block and a transform skip block. The entropy encoder 480 codes the transform coefficients of a coding block by using non-overlapped coefficient groups (CGs or sub-blocks) and each CG contains the transform coefficients of a coding block of a variable size. The size of the coefficient group is selected based on a transform block size only, which is independent of channel type. The size of the CGs may include 1×16, 2×8, 8×2, 2×4, 4×2, and 16×1. The CGs inside each coding block and the transform coefficients within each CG are coded according to pre-defined scanning orders.

In one embodiment, each coding block in a transform unit is split into a plurality of sub-blocks and each sub-block is split into a plurality of pixels. The plurality of sub-blocks are 4×4 or 2×2 sub-blocks.

In the arithmetic coding algorithm, a probability model is dynamically selected for each syntax element depending on the previously coded information.

The inverse quantization/inverse transform unit 450 reverses the quantization process and the transform process performed by the transform/quantization unit 440 and feeds an output to the addition unit 460 to reconstruct the picture frame. The addition unit 460 also takes the output of the prediction unit 430 as another input. The reconstructed picture frame will be filtered by the in-loop filter 470. The in-loop filter 470 includes a deblocking filter, a sample adaptive offset (SAO) filter, and an adaptive loop filter (ALF), which are cascaded in this order. The output of the in-loop filter 470 is inputted into the prediction unit 430.

Figure 5:
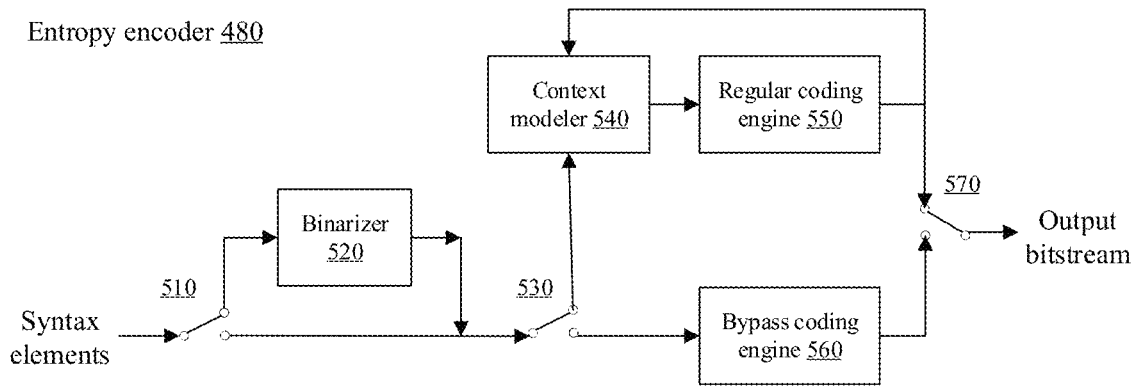
FIG. 5 illustrates the entropy encoder shown in FIG. 4.

FIG. 5 illustrates a structural block diagram of the entropy encoder 480 shown in FIG. 4. As shown in FIG. 5, the entropy encoder 480 includes a first selector 510, a binarizer 520, a second selector 530, a context modeler 540, a regular coding engine 550, a bypass coding engine 560, and a third selector 570. The input of the entropy encoder 480 is one or more syntax elements and the output of the entropy encoder 480 is a bitstream.

In one embodiment, the entropy encoder 480 runs an arithmetic coding algorithm, more specifically, a context-adaptive binary arithmetic coding algorithm (CABAC). The first selector 510 determines whether the syntax element inputted into the entropy encoder 480 is processed in a bypass mode or in a regular encoding mode. In the bypass mode, the syntax element bypasses the binarizer 510. In the regular encoding mode, the syntax element is processed by the binarizer 520 to be mapped to a binary symbol or a bin. The second selector 530 determines whether to encode the syntax element by the regular coding engine 550 or by the bypass coding engine 560. In the bypass mode, the syntax element is encoded by the bypass coding engine 560. In the regular encoding mode, the syntax element is encoded by the regular coding engine 550. Before the syntax element is encoded by the regular coding engine 550, the context modeler 540 estimates a probability of each non-bypassed or regularly coded binary symbol (or bin) based on certain contexts. Then, the regular coding engine 550 compresses the bin to bits according to the estimated probability.

In some embodiments, the binarization process performed by the binarizer 520 may include k-th order truncated Rice (TRk), k-th order Exp-Golomb (EGk), fixed-length (FL) binarization, and a combination thereof. The present disclosure does not limit the binarization process employed by binarizer 520.

In some embodiments, a probability model may be chosen based on a fixed choice, a type of the syntax element, a bin position (or a bin index) in the binarized representation of the syntax element, or may be adaptively chosen from two or more probability models depending on related side information (context information). The related side information may include spatial neighbor, component, depth or size of the CU, the PU and the TU, or position within the TU. Choosing the probability model is also referred to as context modeling. Parameters of the probability model are adaptive. In other words, the parameters of the probability model adapt to statistical variations of binary symbols or bins on a symbol-by-symbol or bin-by-bin basis in a backward adaptive and synchronized way between the entropy encoder and the corresponding decoder. The adaptation process is also called probability estimation. The probability model is often addressed by a unique context index. The context index may be determined by a fixed assignment or computed by a context derivation logic.

Figure 6:
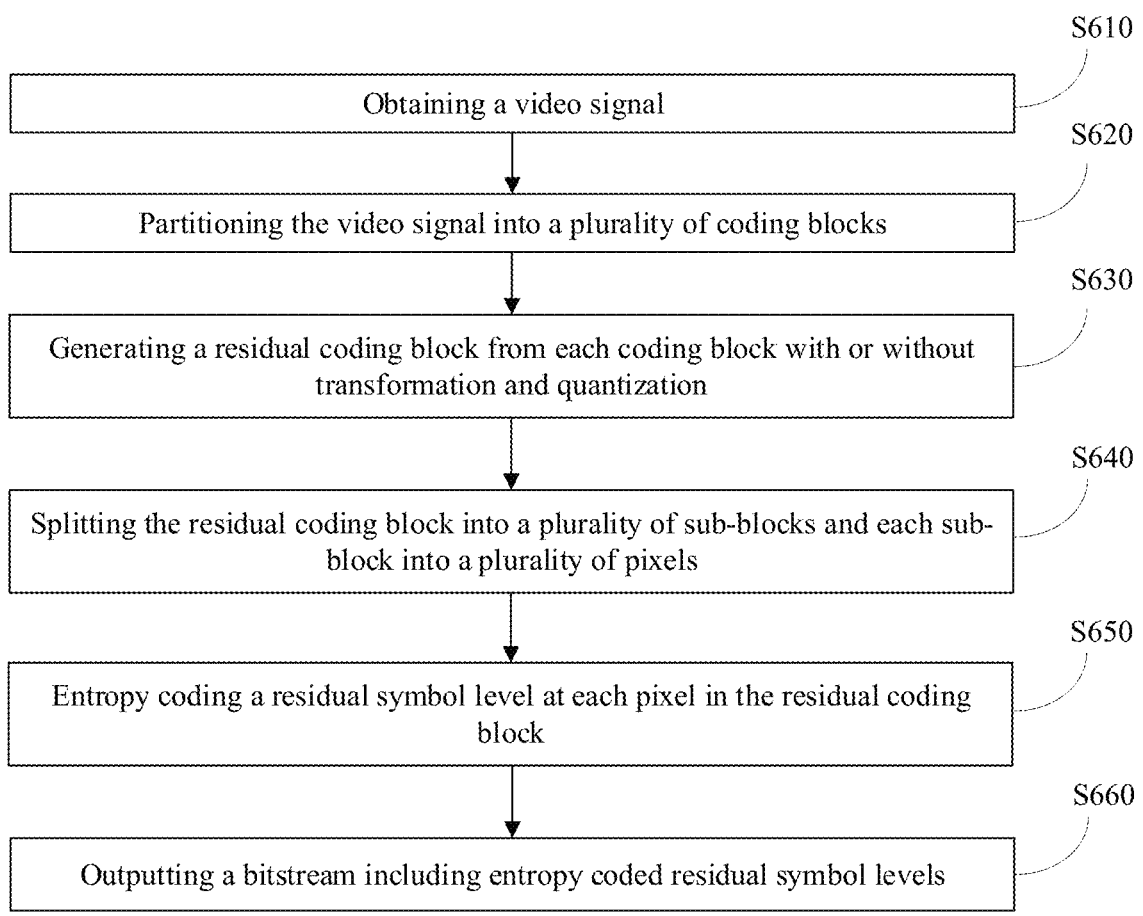
FIG. 6 illustrates a flowchart of an exemplary video coding method consistent with embodiments of the present disclosure.

The present disclosure provides a video coding method for an electronic device. FIG. 6 illustrates a flowchart of an exemplary versatile video coding method consistent with embodiments of the present disclosure.

As shown in FIG. 6, the video coding method includes obtaining a video signal (at S610). The video signal includes a plurality of frames and each frame is partitioned into a plurality of coding blocks (at S620). A residual coding block is generated from each coding block with or without transformation and quantization (at S630). In alignment with common practice, a residual block is also called a transform block. The generated residual coding block is split into a plurality of sub-blocks and each sub-block is split into a plurality of pixels (at S640). Then, a residual symbol level at each pixel in the residual coding block is entropy coded (at S650) to output a bitstream including entropy coded residual symbol levels (at S660).

The operation principle of the video coding method is similar to the video encoder 400 in FIG. 4. The detail description of the video coding method is omitted.

Figure 7:
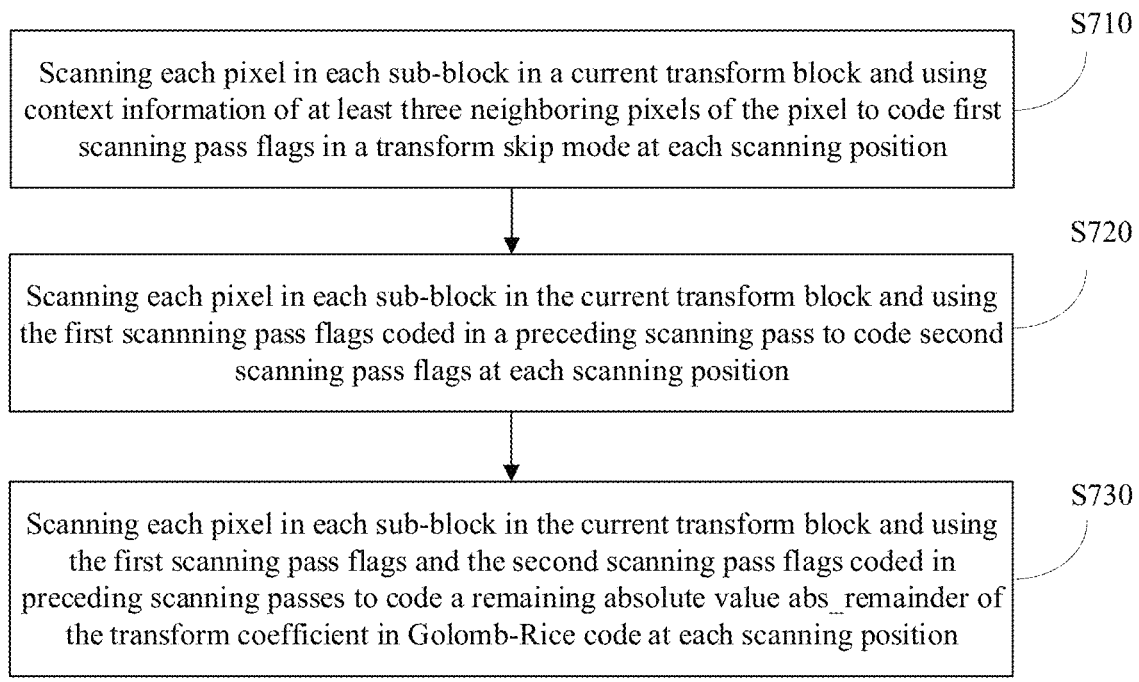
FIG. 7 illustrates a flowchart of context modeling for entropy coding of transform coefficient flags in a transform skip mode consistent with embodiments of the present disclosure.

FIG. 7 illustrates a flowchart of context modeling for entropy coding of transform coefficient flags in a transform skip mode consistent with embodiments of the present disclosure.

In the transform skip mode, the sub-blocks inside the current coding block and the transform coefficient significant flag of each sub-block are coded according to predefined scanning orders, respectively. Similarly, the pixels within each sub-block and the transform coefficient significant flag of each pixel are coded according the predefined scanning orders, respectively. For the sub-block without any non-zero transform coefficient, the corresponding transform coefficient significant flag is coded at the sub-block level. For the sub-block with at least one non-zero transform coefficient, the coding of the transform coefficient of each pixel in the sub-block is separated into three scanning passes.

In the first scanning pass at S710, each pixel in each sub-block in a current transform block is scanned and context information of at least three neighboring pixels of the pixel are used to code first scanning pass flags in the transform skip mode at each scanning position. The first scanning pass flags include a transform coefficient significant flag sig_coeff_flag, a transform coefficient sign flag coeff_sign_flag, a transform coefficient parity flag par_level_flag, and an absolute-level-greater-than-1 flag abs_level_gtx_flag[0]. The sig_coeff_flag[xC][yC] is also called the transform coefficient significant flag and specifies, for the transform coefficient located at the current position (xC, yC) within the current transform block, whether a value of the corresponding transform coefficient at the current position (xC, yC) is non-zero. If the value of the transform coefficient is non-zero, the sig_coeff_flag[xC][yC] has a value of 1, otherwise the sig_coeff_flag[xC][yC] has a value of 0. The coeff_sign_flag is also called the transform coefficient sign flag and specifies whether the sign of the non-zero value of the transform coefficient at each scanning position is negative or not. If the sign is negative, the coeff_sign_flag has a value of 1, otherwise the coeff_sign_flag has a value of 0. The abs_level_gtx_flag[0] is also called the absolute-level-greater-than-1 flag and specifies whether the absolute value of the transform coefficient at the scanning position is greater than 1. If the absolute value of the transform coefficient at each scanning position is greater than 1, abs_level_gtx_flag[0] has a value of 1, otherwise abs_level_gtx_flag[0] has a value of 0. The par_level_flag is also called the transform coefficient level parity flag and specifies the parity of the value of the transform coefficient at each scanning position.

In the second scanning pass at S720, each pixel in each sub-block in the current transform block is scanned and the first scanning pass flags coded in a preceding scanning pass are used to code second scanning pass flags at each scanning position. The second scanning pass flags include an absolute-level-greater-than-x flag array abs_level_gtx_flag[i], wherein x=(i<<1)+1 for i=1, 2, 3, and 4. The abs_level_gtx_flag[i] is also called the absolute-level-greater-than-x flag array and specifies whether the absolute value of the transform coefficient at each scanning position is greater than x, where x=(i<<1)+1 for i=1, 2, 3, and 4. In other words, the abs_level_gtx_flag[i] specifies whether the absolute value of the transform coefficient at each scanning position is greater than 3, 5, 7, and 9 corresponding to i=1, 2, 3, and 4, respectively. The combination of the flags par_level_flag and abs_level_gtx_flag[i] uniquely identifies where the absolute value of the transform coefficient falls between two consecutive positive integers (no more than 9).

In the third scanning pass at S730, each pixel in each sub-block in the current transform block is scanned and the first scanning pass flags and the second scanning pass flags coded in preceding scanning passes are used to code a remaining absolute value abs_remainder of the transform coefficient in Golomb-Rice code at each scanning position.

Further, encoding the sig_coeff_flag[xC][yC] of the transform coefficient located at the pixel position (xC, yC) within the current transform block in the first pass includes the following processes.

Figure 8:
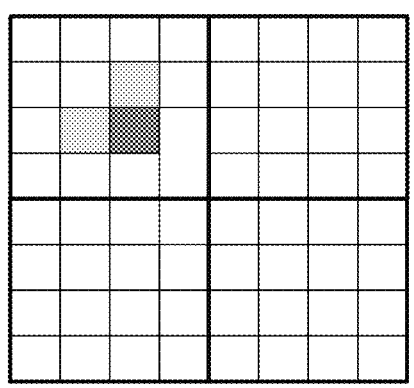
FIG. 8 illustrates a local template in the transform skip mode consistent with embodiments of the present disclosure.
Figure 9:
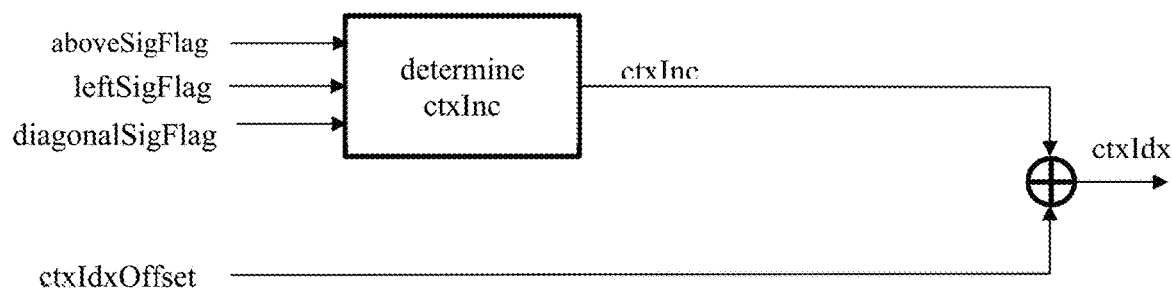
FIG. 9 illustrates context index calculation for a transform coefficient significant flag in the transform skip mode consistent with embodiments of the present disclosure.
Figure 10:
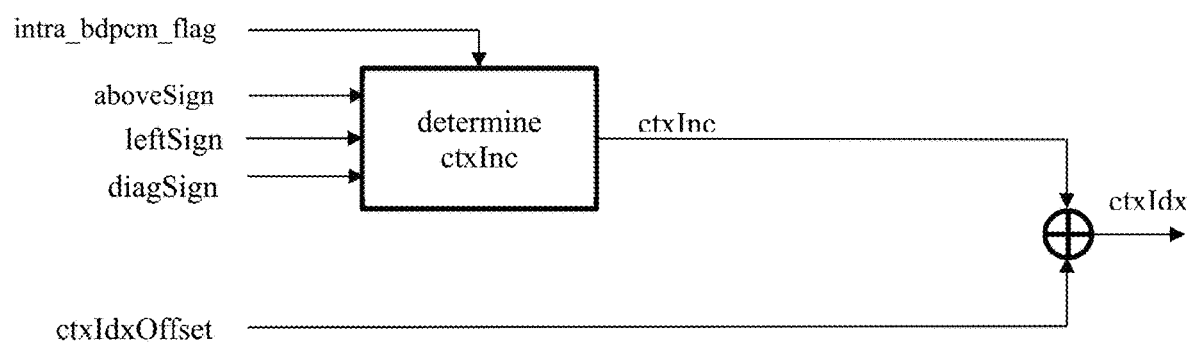
FIG. 10 illustrates context index calculation for a transform coefficient sign flag in the transform skip mode consistent with embodiments of the present disclosure.

In one embodiment, to exploit the correlation between adjacent transform coefficients in the transform skip mode, previously coded significant coefficient flags covered by a local template shown in FIG. 8 are used in context selection for the current significant coefficient flag sig_coeff_flag[xC][yC], where the position labeled in dark grey indicates the current transform coefficient position (xC, yC) and the positions labeled in light grey indicates its three neighbors called leftSigFlag at (xC−1, yC), aboveSigFlag at (xC, yC−1), and diagonalSigFlag at (xC−1, yC−1). If the location of the significant coefficient flag in the local template is not in the transform unit, it is assigned a default value of zero. In particular, the leftSigFlag, the aboveSigFlag, and the diagonalSigFlag are defined in the followings:

$$\text{leftSigFlag}=xC>0?\text{sig\_coeff\_flag}[xC-1][yC]:0. \quad \text{(Eq. 1)}$$

$$\text{aboveSigFlag}=yC>0?\text{sig\_coeff\_flag}[xC][yC-1]:0. \quad \text{(Eq. 2)}$$

$$\text{diagonalSigFlag}=(xC>0 \ \&\& \ yC>0)?\text{sig\_coeff\_flag}[xC-1][yC-1]:0. \quad \text{(Eq. 3)}$$

In one embodiment, the context of sig_coeff_flag[xC][yC] is based on the diagonalSigFlag and the sum of the significant coefficient flags of the leftSigFlag and the aboveSigFlag (together called locNumSig), which is defined in the following:

$$\text{locNumSig}=\text{leftSigFlag}+\text{aboveSigFlag}. \quad \text{(Eq. 4)}$$

When coding sig_coeff_flag[xC][yC] of the current coefficient, the context model index, ctxIdx, is set equal to the sum of ctxInc and ctxIdxOffset, as in the followings:

$$\text{ctxInc}=60+((\text{locNumSig}=1)?2*\text{diagonalSigFlag}+\text{locNumSig}:\text{locNumSig}), \quad \text{(Eq. 5)}$$

$$\text{ctxIdx}=\text{ctxInc}+\text{ctxIdxOffset}, \quad \text{(Eq. 6)}$$

where the variable ctxIdxOffset is specified in Table 9-4 of VVC Draft 6 for residual coding depending on a current value of initType or initializationType as shown in Table 1.

TABLE 1

Association of ctxIdx and residual coding syntax elements
for each initializationType in the initialization process

| Syntax structure | Syntax element | ctxTable | initType 0 | initType 1 | initType 2 |
|---|---|---|---|---|---|
| residual_coding ( ) | last_sig_coeff_x_prefix | Table 9-70 | 0 . . . 22 | 23 . . . 45 | 46 . . . 68 |
| | last_sig_coeff_y_prefix | Table 9-71 | 0 . . . 22 | 23 . . . 45 | 46 . . . 68 |
| | coded_sub_block_flag[ ][ ] | Table 9-72 | 0 . . . 7 | 8 . . . 15 | 16 . . . 23 |
| | sig_coeff_flag[ ][ ] | Table 9-73 | 0 . . . 63 | 64 . . . 127 | 128 . . . 191 |
| | par_level_flag[ ] | Table 9-74 | 0 . . . 32 | 33 . . . 65 | 66 . . . 98 |
| | abs_level_gtx_flag[ ][ ] | Table 9-75 | 0 . . . 73 | 74 . . . 147 | 148 . . . 220 |
| | coeff_sign_flag[ ] | Table 9-76 | 0 . . . 9 | 10 . . . 19 | 20 . . . 29 |

Note:
Table numbers in the ctxTable column refer to table numbers in the VVC standard (draft 6).

In one embodiment, all possible values of a tuple (leftSigFlag, aboveSigFlag, diagonalSigFlag) are classified into p classes, where p is an integer and $3<p\leq 8$. Each class is assigned with a unique context increment offset number, ctxIncOffset, such that $0\leq ctxIncOffset<p$. A context index increment, ctxInc, is derived as the following:

$$ctxInc = k + ctxIncOffset, \quad (Eq.\ 7)$$

where k is the number of contexts of the transform coefficient significant flag without transform skip. The context model index, ctxIdx, is set equal to the sum of the ctxInc and the ctxIdxOffset in the following:

$$ctxIdx = ctxInc + ctxIdxOffset. \quad (Eq.\ 8)$$

In one embodiment, the value of the context increment offset, ctxIncOffset, defined as ctxInc-k, where k is equal to 60 in VVC draft 6, can also be determined by Table 2. As shown in Table 2, all possible outcomes of the tuple (leftSigFlag, aboveSigFlag, diagonalSigFlag) are divided into four classes:

The leftSigFlag and the aboveSigFlag are both zero.
The leftSigFlag and the aboveSigFlag are both one.
The leftSigFlag and the aboveSigFlag are different and the diagonalSigFlag is zero.
The leftSigFlag and the aboveSigFlag are different and the diagonalSigFlag is one.

Each class is assigned with a unique ctxIncOffset number between 0 to 3.

TABLE 2

Select ctxIncOffset based on (leftSigFlag, aboveSigFlag, diagonalSigFlag)

| leftSigFlag | aboveSigFlag | diagonalSigFlag 0 | diagonalSigFlag 1 |
|---|---|---|---|
| 0 | 0 | 0 | 0 |
| 0 | 1 | 1 | 3 |
| 1 | 0 | 1 | 3 |
| 1 | 1 | 2 | 2 |

In one embodiment, the number of context models for coding sig_coeff_flag[xC][yC] in the transform skip mode is 4, and the number of context coded bins in the residual coding of transform skip transform coefficient includes, but is not limited to, 2 bins per transform coefficient and 1.75 bins per transform coefficient.

In one embodiment, the number of context coded bin in the residual coding of transform skip transform coefficient is 2 bins per transform coefficient as determined by MaxCcbs=2*(1<<log 2TbWidth)*(1<<log 2TbHeight). The complete residual coding syntax with transform skip is shown in Table 3.

TABLE 3

Syntax of residual coding with transform skip

| | Descriptor |
|---|---|
| residual_ts_coding( x0, y0, log2TbWidth, log2TbHeight, cIdx ) { | |
|     log2SbSize = ( Min( log2TbWidth, log2TbHeight ) < 2 ? 1 : 2 ) | |
|     numSbCoeff = 1 << ( log2SbSize << 1 ) | |
|     lastSubBlock = ( 1 << ( log2TbWidth + log2TbHeight − 2 * log2SbSize ) ) − 1 | |
|     inferSbCbf = 1 | |
|     MaxCcbs = 2 * ( 1 << log2TbWidth ) * ( 1<< log2TbHeight ) | |
|     for( i =0; i <= lastSubBlock; i++ ) { | |
|         xS = DiagScanOrder[ log2TbWidth − log2SbSize ][ log2TbHeight − log2SbSize ][ i ][ 0 ] | |
|         yS = DiagScanOrder[ log2TbWidth − log2SbSize ][ log2TbHeight − log2SbSize ][ i ][ 1 ] | |
|         if( ( i != lastSubBlock \|\| !inferSbCbf ) { | |
|             coded_sub_block_flag[ xS ][ yS ] | ae(v) |
|         } | |
|         if( coded_sub_block_flag[ xS ][ yS ] && i < lastSubBlock ) | |
|             inferSbCbf = 0 | |
|         /* First scan pass */ | |
|         inferSbSigCoeffFlag = 1 | |

TABLE 3-continued

Syntax of residual coding with transform skip

| | Descriptor |
|---|---|

```
            for( n = 0; n <= numSbCoeff − 1; n++ ) {
                xC = ( xS << log2SbSize ) +
DiagScanOrder[ log2SbSize ][ log2SbSize ][ n ][ 0 ]
                yC = ( yS << log2SbSize ) +
DiagScanOrder[ log2SbSize ][ log2SbSize ][ n ][ 1 ]
                if( coded_sub_block_flag[ xS ][ yS ] &&
                    ( n != numSbCoeff − 1 | | !inferSbSigCoeffFlag ) ) {
                    sig_coeff_flag[ xC ][ yC ]                          ae(v)
                    MaxCcbs−−
                    if( sig_coeff_flag[ xC ][ yC ] )
                        inferSbSigCoeffFlag = 0
                }
                CoeffSignLevel[ xC ][ yC ] = 0
                if( sig_coeff_flag[ xC ][ yC ] {
                    coeff_sign_flag[ n ]                                ae(v)
                    MaxCcbs−−
                    CoeffSignLevel[ xC ][ yC ] = ( coeff_sign_flag[ n ] > 0 ? −1 : 1 )
                    abs_level_gtx_flag[ n ][ 0 ]                        ae(v)
                    MaxCcbs−−
                    if( abs_level_gtx_flag[ n ][ 0 ] ) {
                        par_level_flag[ n ]                             ae(v)
                        MaxCcbs−−
                    }
                }
                AbsLevelPassX[ xC ][ yC ] =
                    sig_coeff_flag[ xC ][ yC ] + par_level_flag[ n ] +
abs_level_gtx_flag[ n ][ 0 ]
            }
    /* Greater than X scan pass (numGtXFlags=5) */
            for( n = 0; n <= numSbCoeff − 1; n++ ) {
                xC = ( xS << log2SbSize ) +
DiagScanOrder[ log2SbSize ][ log2SbSize ][ n ][ 0 ]
                yC = ( yS << log2SbSize ) +
DiagScanOrder[ log2SbSize ][ log2SbSize ][ n ][ 1 ]
                for( j = 1; j < 5; j++ ) {
                    if( abs_level_gts_flag[ n ][ j − 1 ] ) {
                        abs_level_gtx_flag[ n ][ j ]                    ae(v)
                        MaxCcbs−−
                        AbsLevelPassX[ xC ][ yC ] + = 2 * abs_level_gtx_flag[ n ][ j ]
                    }
                }
            }
    /* remainder scan pass */
            for( n = 0; n <= numSbCoeff − 1; n++ ) {
                xC = ( xS << log2SbSize ) +
DiagScanOrder[ log2SbSize ][ log2SbSize ][ n ][ 0 ]
                yC = ( yS << log2SbSize ) +
DiagScanOrder[ log2SbSize ][ log2SbSize ][ n ][ 1 ]
                if( abs_level_gtx_flag[ n ][ 4 ] )
                    abs_remainder[ n ]                                  ae(v)
                if( intra_bdpcm_flag == 0 ) {
                    absRightCoeff = xC > 0 ? abs(
TransCoeffLevel[ x0 ][ y0 ][ cIdx ][ xC − 1 ][ yC ] ) : 0
                    absBelowCoeff = yC > 0 ? abs(
TransCoeffLevel[ x0 ][ y0 ][ cIdx ][ xC ][ yC − 1 ] ) : 0
                    predCoeff = Max( absRightCoeff, absBelowCoeff)
                    if( AbsLevelPassX[ xC ][ yC ] + abs_remainder[ n ] == 1 &&
predCoeff> 0 )
                        TransCoeffLevel[ x0 ][ y0 ][ cIdx ][ xC ][ yC ] =
                            ( 1 − 2 * coeff_sign_flag[ n ] ) * predCoeff
                    else if( AbsLevelPassX[ xC ][ yC ] + abs_remainder[ n ] <=
predCoeff)
                        TransCoeffLevel[ x0 ][ y0 ][ cIdx ][ xC ][ yC ] = ( 1 − 2 *
coeff_sign_flag[ n ] ) *
                            ( AbsLevelPassX[ xC ][ yC ] +
abs_remainder[ n ] − 1)
                    else
                        TransCoeffLevel[ x0 ][ y0 ][ cIdx ][ xC ][ yC ] = ( 1 − 2 *
coeff_sign_flag[ n ] ) *
                            ( AbsLevelPassX[ xC ][ yC ] +
abs_remainder[ n ] )
                } else
                    TransCoeffLevel[ x0 ][ y0 ][ cIdx ][ xC ][ yC ] = ( 1 − 2 *
coeff_sign_flag[ n ] ) *
```

TABLE 3-continued

Syntax of residual coding with transform skip

|  | Descriptor |
|---|---|
| ( AbsLevelPassX[ xC ][ yC ] + abs_remainder[ n ] )<br>       }<br>    }<br>} |  |

The value of the ctxIncOffset may be determined by table lookup, certain equations, certain logics, or a combination thereof. The present disclosure does not limit the method of determining the ctxIncOffset.

The flag coded_sub_block_flag[xS][yS] specifies the following for the subblock at location (xS, yS) within the current transform block, where a subblock is a (4×4) array of 16 transform coefficient levels. If coded_sub_block_flag [xS][yS] is equal to 0, the 16 transform coefficient levels of the subblock at location (xS, yS) are inferred to be equal to 0. Otherwise coded_sub_block_flag[xS][yS] is equal to 1, and the following applies. If (xS, yS) is equal to (0, 0) and (LastSignificantCoeffX, LastSignificantCoeffY) is not equal to (0, 0), at least one of the 16 sig_coeff_flag syntax elements is present for the subblock at location (xS, yS). Otherwise, at least one of the 16 transform coefficient levels of the subblock at location (xS, yS) has a non-zero value. When coded_sub_block_flag[xS][yS] is not present, it is inferred to be equal to 1.

The flag sig_coeff_flag[xC][yC] specifies for the transform coefficient location (xC, yC) within the current transform block whether the corresponding transform coefficient level at the location (xC, yC) is non-zero. If sig_coeff_flag [xC][yC] is equal to 0, the transform coefficient level at the location (xC, yC) is set equal to 0. If sig_coeff_flag[xC][yC] is equal to 1, the transform coefficient level at the location (xC, yC) has a non-zero value. When sig_coeff_flag[xC] [yC] is not present, it is inferred as follows. If (xC, yC) is the last significant location (LastSignificantCoeffX, LastSignificantCoeffY) in scan order or all of the following conditions are true, sig_coeff_flag[xC][yC] is inferred to be equal to 1. If (xC & ((1<<log 2SbW)−1), yC & ((1<<log 2SbH)−1)) is equal to (0, 0), inferSbDcSigCoeffFlag is equal to 1, and coded_sub_block_flag[xS][yS] is equal to 1. Otherwise, sig_coeff_flag[xC][yC] is inferred to be equal to 0.

The flag coeff_sign_flag specifies the sign of a transform coefficient level for each scanning position as follows. If coeff_sign_flag is equal to 0, the corresponding transform coefficient level has a positive value. If coeff_sign_flag is equal to 1, the corresponding transform coefficient level has a negative value. When coeff_sign_flag is not present, it is inferred to be equal to 0. The value of CoeffSignLevel[xC] [YC] specifies the sign of a transform coefficient level at the location (xC, yC) as follows. If CoeffSignLevel[xC][yC] is equal to 0, the corresponding transform coefficient level is equal to zero. If CoeffSignLevel[xC][yC] is equal to 1, the corresponding transform coefficient level has a positive value. If CoeffSignLevel[xC][yC] is equal to −1, the corresponding transform coefficient level has a negative value.

The flag par_level_flag specifies the parity of the transform coefficient level at each scanning position. When par_level_flag is not present, it is inferred to be equal to 0.

The flag array abs_level_gtx_flag[j] specifies whether the absolute value of the transform coefficient level at each scanning position is greater than (j<<1)+1. When abs_level_gtx_flag[j] is not present, it is inferred to be equal to 0.

The parameter abs_remainder is the remaining absolute value of a transform coefficient level that is coded with Golomb-Rice code at each scanning position. When abs_remainder is not present, it is inferred to be equal to 0. It is a requirement of bitstream conformance that the value of abs_remainder shall be constrained such that the corresponding value of TransCoeffLevel[x0][y0][cIdx][xC][yC] is in the range of CoeffMin to CoeffMax, inclusive.

In one embodiment, coding of transform coefficient significant flag with transform skip is applied to one luma transform unit of the transform unit.

In one embodiment, coding of transform coefficient significant flag with transform skip is applied to one luma transform unit and one or two chroma transform units of the transform unit.

Further, encoding the coeff_sign_flag[xC][yC] of the transform coefficient located at the pixel position (xC, yC) within the current transform block in the first pass includes the following processes.

The determination of coeff_sign_flag[xC][yC] depends on the value of CoeffSignLevel[xC][yC] which specifies the sign of the value of a transform coefficient at the position (xC, yC) as follows. If CoeffSignLevel[xC][yC] is equal to 0, the value of the corresponding transform coefficient is equal to zero. If CoeffSignLevel[xC][yC] is equal to 1, the corresponding transform coefficient has a positive value. If CoeffSignLevel[xC][yC] is equal to −1, the corresponding transform coefficient has a negative value.

In one embodiment, to exploit the correlation between adjacent transform coefficients in the transform skip mode, previously coded coefficient sign level, CoeffSignLevel[xC] [yC], covered by the local template shown in FIG. 8 are used in context selection for the current coefficient sign flag coeff_sign_flag[xC][yC], where the position labeled in dark grey indicates the current transform coefficient position (xC, yC) and the positions labeled in light grey indicates its three neighboring sign variables called leftSign at (xC−1, yC), aboveSign at (xC, yC−1), and diagSign at (xC−1, yC−1). If the location of sign level in the local template is not in the transform unit, it is assigned a default value of zero. In particular, leftSign, aboveSign, and diagSign are defined in the following:

$$\text{leftSign}=(xC==0)?0:\text{CoeffSignLevel}[xC-1][yC]. \quad \text{(Eq. 9)}$$

$$\text{aboveSign}=(yC==0)?0:\text{CoeffSignLevel}[xC][yC-1]. \quad \text{(Eq. 10)}$$

$$\text{diagSign}=(xC==0||yC==0)?0:\text{CoeffSignLevel}[xC-1][yC-1]. \quad \text{(Eq. 11)}$$

In one embodiment, the context index of coeff_sign_flag [xC][yC] is determined based on the diagSign, leftSign and aboveSign as defined in the following.

The variable ctxInc is derived as follows. If the leftSign is equal to 0 and the aboveSign is equal to 0, or if the leftSign is equal to -aboveSign, the following applies:

$$\text{ctxIncOffset}=(\text{diagSign}==0)?0:((\text{leftSign }!=0)?3+(\text{diagSign}>=0):4-(\text{diagSign}>=0)). \quad \text{(Eq. 12)}$$

Otherwise, if the leftSign is greater than or equal to 0 and the aboveSign is greater than or equal to 0, the following applies:

$$ctxIncOffset=diagSign>=0?1:3. \quad (Eq.\ 13)$$

Otherwise, the following applies:

$$ctxIncOffset=diagSign<=0?2:4. \quad (Eq.\ 14)$$

Then the context index increment, ctxInc, is derived as the following:

$$ctxInc=ctxIncOffset+(intra\_bdpcm\_flag==0?0:5), \quad (Eq.\ 15)$$

where the intra_bdpcm_flag equal to 1 specifies that BDPCM is applied to the current firma coding block at the location (x0, y0), and the infra_bdpcm_flag equal to 0 specifies that BDPCM is not applied to the current luma coding block at the location (x0, y0).

The context model index, ctxIdx, is set equal to the sum of ctxInc and ctxIdxOffset as in the following:

$$ctxIdx=ctxInc+ctxIdxOffset \quad (Eq.\ 16)$$

where the variable ctxIdxOffset of coeff_sign_flag[xC][yC] is specified in Table 9-4 of VVC Draft 6 for residual coding depending on a current value of initType or initializationType as shown in Table 1.

In one embodiment, all possible values of a tuple (leftSign, aboveSign, diagSign) are classified into q classes, where q is an integer and $3<q\leq27$. Each class is assigned with a unique context increment offset number, ctxIncOffset, such that $0\leq ctxIncOffset<q$. The context index increment, ctxInc, is derived as the following:

$$ctxInc=ctxIncOffset+(intra\_bdpcm\_flag==0?0:q). \quad (Eq.\ 17)$$

A context model index, ctxIdx, is set equal to the sum of ctxInc and ctxIdxOffset as in the following:

$$ctxIdx=ctxInc+ctxIdxOffset. \quad (Eq.\ 18)$$

The context increment offset, ctxIncOffset, is a function of leftSign, aboveSign, and diagSign. The value of the ctxIncOffset may be determined by table lookup, certain equations, certain logics, or a combination thereof. The present disclosure does not limit the method of determining the ctxIncOffset.

In one embodiment, the value of the ctxIncOffset can be determined by Table 4. As shown in Table 4, all possible outcomes of the tuple (leftSign, aboveSign, diagSign) are divided into five classes. Each class is assigned with a unique ctxIncOffset number between 0 to 4.

TABLE 4

Select ctxIncOffset based on (leftSign, aboveSign, diagSign)

| (leftSign, aboveSign), | diagSign | | |
|---|---|---|---|
| | −1 | 0 | 1 |
| (−1, −1), (−1, 0), (0, −1) | 2 | 2 | 4 |
| (−1, 1), (1, −1) | 3 | 0 | 4 |
| (0, 0) | 4 | 0 | 3 |
| (1, 1), (1, 0), (0, 1) | 3 | 1 | 1 |

In one embodiment, the value of the ctxIncOffset can be determined by Table 5. As shown in Table 5, all possible outcomes of the pair (leftSign+aboveSign) and diagSign are divided into five classes. Each class is assigned with a unique ctxIncOffset number between 0 to 4.

TABLE 5

Select ctxIncOffset based on (leftSign + aboveSign) and diagSign

| leftSign + aboveSign | diagSign | | |
|---|---|---|---|
| | −1 | 0 | 1 |
| −2, −1 | 2 | 2 | 4 |
| 0 | 3 | 0 | 4 |
| 1, 2 | 3 | 1 | 1 |

In one embodiment, the value of the ctxIncOffset can be determined by Table 6. As shown in Table 6, all possible outcomes of the tuple (leftSign, aboveSign, diagSign) are divided into five classes. Each class is assigned with a unique ctxIncOffset number between 0 to 4.

TABLE 6

Select ctxIncOffset based on (leftSign + aboveSign) and diagSign

| leftSign + aboveSign | diagSign | | |
|---|---|---|---|
| | −1 | 0 | 1 |
| −2, −1 | 2 | 2 | 4 |
| 0 | 4 | 0 | 3 |
| 1, 2 | 3 | 1 | 1 |

In one embodiment, the number of context models for coding coeff_sign_flag[xC][yC] in the transform skip mode is 10, and the number of context coded bins in the regular transform mode in the residual coding of transform skip transform coefficient includes, but is not limited to, 1.75 bins per each transform coefficient.

In one embodiment, the number of context coded bin in regular mode in the residual coding of transform skip transform coefficient is 2 bins per transform coefficient as determined by MaxCcbs=2*(1<<log 2TbWidth)*(1<<log 2TbHeight). The complete residual coding syntax from VVC Draft 6 is shown in Table 3.

In one embodiment, coding of transform coefficient sign flag with transform skip is applied to one luma transform unit of the transform unit.

In one embodiment, coding of transform coefficient sign flag with transform skip is applied to one luma transform unit and one or two chroma transform units of the transform unit.

In general, for screen content coding test sequences, when the number of context coded bin in residual coding of transform skipped transform coefficient is changed from 2 to 1.75 bins per coefficient in VTM-6.0, an increase of luma BDR was observed when tested at QPs (37, 32, 27, 22). In particular, an increase of 0.26%, 0.20%, and −0.02% luma BDR, for AI, RA, and LD configurations respectively were observed. When the preferred significant flag and sign flag coding method is implemented in VTM-6.0, an increase of −0.10%, −0.13%, and −0.28% luma BDR, for AI, RA, and LD configurations respectively were observed. Thus, the number of context coded bins per transform coefficient is changed from 2 to 1.75 without sacrificing coding efficiency.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A versatile video coding (VVC) method for an electronic device, comprising:
   obtaining a video signal;
   partitioning the video signal into a plurality of coding blocks;
   generating a residual coding block from each coding block with or without transformation and quantization;
   splitting the residual coding block into a plurality of sub-blocks and each sub-block into a plurality of pixels;
   entropy coding a residual level at each pixel in the residual coding block; and
   outputting a bitstream including entropy coded residual levels,
   wherein:
      entropy coding the residual level at each pixel in the residual coding block includes context modeling of the residual level of the pixel in a transform skip mode based on context information of at least three neighboring pixels of the pixel including a first pixel on the left, a second pixel on the above, and a third pixel on the left-above diagonal in the residual coding block;
      the context modeling includes a transform coefficient significant flag sig_coeff_flag; and
      coding the transform coefficient significant flag sig_coeff_flag in the transform skip mode includes:
         obtaining the transform coefficient significant flag of the first pixel leftSigFlag, the transform coefficient significant flag of the second pixel aboveSigFlag, and the transform coefficient significant flag of the third pixel diagonalSigFlag, wherein when any of the first pixel, the second pixel, the third pixel is not located in a current transform unit, the corresponding transform coefficient significant flag is assigned to a default value of zero;
         classifying all possible values of (leftSigFlag, aboveSigFlag, diagonalSigFlag) into p classes with 3<p≤8 and assigning each class with a unique context increment offset number ctxIncOffset, such that 0≤ctxIncOffset≤p;
         calculating a context index increment ctxInc, wherein ctxInc=k+ctxIncOffset, and k is a number of contexts of the transform coefficient significant flag in the transform skip mode;
         calculating a context model index ctxIdx, wherein ctxIdx=ctxInc+ctxIdxOffset; and
         using the context model index ctxIdx to code the transform coefficient significant flag sig_coeff_flag.

2. The method of claim 1, wherein context modeling of the residual level of the pixel in the transform skip mode based on the context information of the at least three neighboring pixels of the pixel includes:
   scanning each pixel in each sub-block in a current transform block and using the context information of the at least three neighboring pixels of the pixel to code first scanning pass flags in the transform skip mode at each scanning position;
   scanning each pixel in each sub-block in the current transform block and using the first scanning pass flags coded in a preceding scanning pass to code second scanning pass flags at each scanning position; and
   scanning each pixel in each sub-block in the current transform block and using the first scanning pass flags and the second scanning pass flags coded in preceding scanning passes to code a remaining absolute value abs_remainder of the transform coefficient in Golomb-Rice code at each scanning position.

3. The method of claim 2, wherein:
   the first scanning pass flags include the transform coefficient significant flag sig_coeff_flag, a transform coefficient sign flag coeff_sign_flag, a transform coefficient parity flag par_level_flag, and an absolute-level-greater-than-1 flag abs_level_gtx_flag[0]; and
   the second scanning pass flags include an absolute-level-greater-than-x flag array abs_level_gtx_flag[i], wherein x=(i<<1)+1 for i=1, 2, 3, and 4.

4. The method of claim 3, wherein:
   the transform coefficient significant flag sig_coeff_flag specifies, for a transform coefficient located within the current transform block, whether a value of the transform coefficient at the location is non-zero, wherein when the value of the transform coefficient is non-zero, the transform coefficient significant flag is 1, and otherwise, the transform coefficient significant flag is 0;
   the transform coefficient sign flag coeff_sign_flag specifies whether the sign of the transform coefficient having the non-zero value at the scanning position is negative or not, wherein when the sign is negative, the transform coefficient sign flag is 1, and otherwise, the transform coefficient sign flag is 0;
   the transform coefficient level parity flag par_level_flag specifies the parity of a value of the transform coefficient at the scanning position;
   the absolute-level-greater-than-1 flag abs_level_gtx_flag[0] specifies whether an absolute value of the transform coefficient at the scanning position is greater than 1, wherein when the absolute value is greater than 1, the absolute-level-greater-than-1 flag is 1, and otherwise, the absolute-level-greater-than-1 flag is 0; and
   the absolute-level-greater-than-x flag array abs_level_gtx_flag[i] specifies whether the absolute value of the transform coefficient at the scanning position is greater than x, wherein x=(i<<1)+1 for i=1, 2, 3, and 4, when the absolute value is greater than x, the absolute-level-greater-than-x flag is 1, and otherwise, the absolute-level-greater-than-x flag is 0.

5. The method of claim 4, wherein coding the transform coefficient significant flag sig_coeff_flag in the transform skip mode includes:
   obtaining the transform coefficient significant flag of the first pixel leftSigFlag, the transform coefficient significant flag of the second pixel aboveSigFlag, and the transform coefficient significant flag of the third pixel diagonalSigFlag, wherein when any of the first pixel, the second pixel, the third pixel is not located in the current transform unit, the corresponding transform coefficient significant flag is assigned to a default value of zero;

classifying all possible values of (leftSigFlag, aboveSigFlag, diagonalSigFlag) into 4 classes and assigning each class with a unique context increment offset number ctxIncOffset as:

| leftSigFlag | aboveSigFlag | diagonalSigFlag | |
|---|---|---|---|
| | | 0 | 1 |
| 0 | 0 | 0 | 0 |
| 0 | 1 | 1 | 3 |
| 1 | 0 | 1 | 3 |
| 1 | 1 | 2 | 2; | calculating a sum locNumSig of the leftSigFlag and the aboveSigFlag, wherein locNumSig=leftSigGlag+aboveSigFlag;
calculating a context index increment ctxInc, wherein ctxInc=60+((locNumSig==1)?2*diagonalSigFlag+locNumSig:locNumSig);
calculating a context model index ctxIdx, wherein ctxIdx=ctxInc+ctxIdxOffset; and
using the context model index to code the transform coefficient significant flag sig_coeff_flag.

6. The method of claim 4, wherein: the method is applied to one luma transform unit of a transform unit.

7. The method of claim 4, wherein:
the method is applied to one luma transform unit and one or more chroma transform units of the transform unit.

8. The method of claim 4, wherein coding the transform coefficient sign flag coeff_sign_flag in the transform skip mode includes:
obtaining the sign of the transform coefficient of the first pixel leftSign, the sign of the transform coefficient of the second pixel aboveSign, and the sign of the transform coefficient of the third pixel diagSign, wherein when any of the first pixel, the second pixel, the third pixel is not located in the current transform unit, the corresponding sign of the transform coefficient is assigned to a default value of zero;
classifying all possible values of (leftSign, aboveSign, diagSign) into q classes with 3<q≤27 and assigning each class with a unique context increment offset number ctxIncOffset, such that 0≤ctxIncOffset≤q;
calculating a context index increment ctxInc, wherein ctxInc=ctxIncOffset+(intra_bdpcm_flag==0?0:n),
wherein intra_bdpcm_flag is a flag indicating whether BDPCM is applied to a current luma coding block at a location (x0, y0), i.e., in the transform skip mode, and when intra_bdpcm_flag is not present, it is inferred to be equal to 0;
calculating a context model index ctxIdx, wherein ctxIdx=ctxInc+ctxIdxOffset; and
using the context model index to code the transform coefficient sign flag coeff_sign_flag.

9. The method of claim 4, wherein coding the transform coefficient sign flag coeff_sign_flag in the transform skip mode includes:
obtaining the sign of the transform coefficient of the first pixel leftSign, the sign of the transform coefficient of the second pixel aboveSign, and the sign of the transform coefficient of the third pixel diagSign, wherein when any of the first pixel, the second pixel, the third pixel is not located in the current transform unit, the corresponding sign of the transform coefficient is assigned to a default value of zero;
classifying all possible values of (leftSign, aboveSign, diagSign) into 5 classes and assigning each class with a unique context increment offset number ctxIncOffset as:

| | diagSign | | |
|---|---|---|---|
| (leftSign, aboveSign), | −1 | 0 | 1 |
| (−1, −1), (−1, 0), (0, −1) | 2 | 2 | 4 |
| (−1, 1), (1, −1) | 3 | 0 | 4 |
| (0, 0) | 4 | 0 | 3 |
| (1, 1), (1, 0), (0, 1) | 3 | 1 | 1; | calculating a context index increment ctxInc, wherein ctxInc=ctxIncOffset+(intra_bdpcm_flag==0?0:5),
wherein intra_bdpcm_flag is a flag indicating whether BDPCM is applied to a current luma coding block at a location (x0, y0), i.e., in the transform skip mode, and when intra_bdpcm_flag is not present, it is inferred to be equal to 0;
calculating a context model index ctxIdx, wherein ctxIdx=ctxInc+ctxIdxOffset; and
using the context model index to code the transform coefficient sign flag coeff_sign_flag.

10. The method of claim 4, wherein coding the transform coefficient sign flag coeff_sign_flag in the transform skip mode includes:
obtaining the sign of the transform coefficient of the first pixel leftSign, the sign of the transform coefficient of the second pixel aboveSign, and the sign of the transform coefficient of the third pixel diagSign, wherein when any of the first pixel, the second pixel, the third pixel is not located in the current transform unit, the corresponding sign of the transform coefficient is assigned to a default value of zero;
classifying all possible values of (leftSign, aboveSign, diagSign) into 5 classes and assigning each class with a unique context increment offset number ctxIncOffset as:

| | diagSign | | |
|---|---|---|---|
| leftSign + aboveSign | −1 | 0 | 1 |
| −2, −1 | 2 | 2 | 4 |
| 0 | 3 | 0 | 4 |
| 1, 2 | 3 | 1 | 1; | calculating a context index increment ctxInc, wherein ctxInc=ctxIncOffset+(intra_bdpcm_flag==0?0:5),
wherein intra_bdpcm_flag is a flag indicating whether BDPCM is applied to a current luma coding block at a location (x0, y0), i.e., in the transform skip mode, and when intra_bdpcm_flag is not present, it is inferred to be equal to 0;
calculating a context model index ctxIdx, wherein ctxIdx=ctxInc+ctxIdxOffset; and
using the context model index to code the transform coefficient sign flag coeff_sign_flag.

11. The method of claim 4, wherein coding the transform coefficient sign flag coeff_sign_flag includes:
obtaining the sign of the transform coefficient of the first pixel leftSign, the sign of the transform coefficient of the second pixel aboveSign, and the sign of the transform coefficient of the third pixel diagSign, wherein when any of the first pixel, the second pixel, the third pixel is not located in the current transform unit, the corresponding sign of the transform coefficient is assigned to a default value of zero;
classifying all possible values of (leftSign, aboveSign, diagSign) into 5 classes and assigning each class with a unique context increment offset number ctxIncOffset as:

|  | diagSign | | |
|---|---|---|---|
| leftsign + aboveSign | −1 | 0 | 1 |
| −2, −1 | 2 | 2 | 4 |
| 0 | 4 | 0 | 3 |
| 1, 2 | 3 | 1 | 1; | calculating a context index increment ctxInc, wherein ctxInc=ctxIncOffset+(intra_bdpcm_flag==0?0:5), wherein intra_bdpcm_flag is a flag indicating whether BDPCM is applied to a current luma coding block at a location (x0, y0), i.e., in the transform skip mode, and when intra_bdpcm_flag is not present, it is inferred to be equal to 0;
calculating a context model index (ctxIdx), wherein ctxIdx=ctxInc+ctxIdxOffset; and
using the context model index to code the transform coefficient sign flag coeff_sign_flag.

12. The method of claim 1, wherein:
the plurality of sub-blocks are 4×4 or 2×2 sub-blocks.

13. A versatile video coding (VVC) system, comprising an electronic device configured to perform:
obtaining a video signal;
partitioning the video signal into a plurality of coding blocks;
generating a residual coding block from each coding block with or without transformation and quantization;
splitting each residual coding block into a plurality of sub-blocks and each sub-block into a plurality of pixels;
entropy coding a residual level at each pixel in each residual coding block; and
outputting a bitstream including entropy coded residual levels,
wherein:
entropy coding the residual level at each pixel in the residual coding block includes context modeling of the residual level of the pixel in a transform skip mode based on context information of at least three neighboring pixels of the pixel including a first pixel on the left, a second pixel on the above, and a third pixel on the left-above diagonal in the residual coding block;
the context modeling includes a transform coefficient significant flag sig_coeff_flag; and
coding the transform coefficient significant flag sig_coeff_flag in the transform skip mode includes:
obtaining the transform coefficient significant flag of the first pixel leftSigFlag, the transform coefficient significant flag of the second pixel aboveSigFlag, and the transform coefficient significant flag of the third pixel diagonalSigFlag, wherein when any of the first pixel, the second pixel, the third pixel is not located in a current transform unit, the corresponding transform coefficient significant flag is assigned to a default value of zero;
classifying all possible values of (leftSigFlag, aboveSigFlag, diagonalSigFlag) into p classes with 3<p≤8 and assigning each class with a unique context increment offset number ctxIncOffset, such that 0≤ctxIncOffset≤p;
calculating a context index increment ctxInc, wherein ctxInc=k+ctxIncOffset, and k is a number of contexts of the transform coefficient significant flag in the transform skip mode;
calculating a context model index ctxIdx, wherein ctxIdx=ctxInc+ctxIdxOffset; and
using the context model index ctxIdx to code the transform coefficient significant flag sig_coeff_flag.

14. The system of claim 13, wherein context modeling of the residual level of the pixel in the transform skip mode based on the context information of the at least three neighboring pixels of the pixel includes:
scanning each pixel in each sub-block in the current transform block and using the context information of the at least three neighboring pixels of the pixel to code first scanning pass flags in the transform skip mode at each scanning position;
scanning each pixel in each sub-block in the current transform block and using the first scanning pass flags coded in a preceding scanning pass to code second scanning pass flags at each scanning position; and
scanning each pixel in each sub-block in the current transform block and using the first scanning pass flags and the second scanning pass flags coded in preceding scanning passes to code a remaining absolute value abs_remainder of the transform coefficient in Golomb-Rice code at each scanning position.

15. The system of claim 14, wherein:
the first scanning pass flags include the transform coefficient significant flag sig_coeff_flag, a transform coefficient sign flag coeff_sign_flag, a transform coefficient parity flag par_level_flag, and an absolute-level-greater-than-1 flag abs_level_gtx_flag[0]; and
the second scanning pass flags include an absolute-level-greater-than-x flag array abs_level_gtx_flag[i], wherein x=(i<<1)+1 for i=1, 2, 3, and 4.

16. The system of claim 15, wherein:
the transform coefficient significant flag sig_coeff_flag specifies, for a transform coefficient located within the current transform block, whether a value of the transform coefficient at the location is non-zero, wherein when the value of the transform coefficient is non-zero, the transform coefficient significant flag is 1, and otherwise, the transform coefficient significant flag is 0;
the transform coefficient sign flag coeff_sign_flag specifies whether the sign of the transform coefficient having the non-zero value at the scanning position is negative or not, wherein when the sign is negative, the transform coefficient sign flag is 1, and otherwise, the transform coefficient sign flag is 0;
the transform coefficient level parity flag par_level_flag specifies the parity of a value of the transform coefficient at the scanning position;
the absolute-level-greater-than-1 flag abs_level_gtx_flag[0] specifies whether an absolute value of the transform coefficient at the scanning position is greater than 1, wherein when the absolute value is greater than 1, the absolute-level-greater-than-1 flag is 1, and otherwise, the absolute-level-greater-than-1 flag is 0; and
the absolute-level-greater-than-x flag array abs_level_gtx_flag[i] specifies whether the absolute value of the transform coefficient at the scanning position is greater than x, wherein x=(i<<1)+1 for i=1, 2, 3, and 4, when the absolute value is greater than x, the absolute-level-greater-than-x flag is 1, and otherwise, the absolute-level-greater-than-x flag is 0.

\* \* \* \* \*